United States Patent [19]
Dundore

[11] 4,012,908
[45] Mar. 22, 1977

[54] TORQUE CONVERTER HAVING ADJUSTABLY MOVABLE STATOR VANE SECTIONS

[75] Inventor: Marvin W. Dundore, Rockford, Ill.

[73] Assignee: Twin Disc, Incorporated, Racine, Wis.

[22] Filed: Jan. 30, 1976

[21] Appl. No.: 654,046

[52] U.S. Cl. .................................. 60/354; 415/161
[51] Int. Cl.$^2$ ........................................ F16D 33/04
[58] Field of Search ............ 60/347, 354, 356, 361, 60/367, 334, 352, 355; 415/161, 162

[56] References Cited
UNITED STATES PATENTS

| | | | |
|---|---|---|---|
| 2,441,818 | 5/1948 | Jandasek | 60/355 |
| 2,733,853 | 2/1956 | Trumpler | 415/161 |
| 3,354,643 | 11/1967 | Paredes | 60/354 |

Primary Examiner—Edgar W. Geoghegan
Attorney, Agent, or Firm—James E. Nilles

[57] ABSTRACT

A torque converter comprises a stationary housing within which a rotatable impeller is mounted for driving a rotatable trubine. The bladed impeller is mounted on an engine driven input shaft, and the bladed turbine is mounted on an output shaft on the same axis as the input shaft. The impeller blades and turbine blades move through an annular oil-filled passage. A plurality of stator blades are disposed in the passage in spaced-apart radial arrangement around the axis of the shafts. Each stator blade is divided into two sections, namely, a fixed forward section and an adjustably movable or pivotable rear section. Means are provided to pivot the rear sections of all of the stator blades simultaneously so as to vary the width of the flow channel between each pair of adjacent stator blades between fully opened and fully closed positions and any position therebetween to thereby control the amount of oil available for use by the impeller and turbine and thereby enable regulation of the power output of the torque converter. The movable rear section of each stator blade is provided with a stem which extends through a sealed opening in the stationary housing and enables pivotal adjustment of the rear section of the stator blade about the axis of the stem. The stem axes are parallel to the shaft axes. Each stem is provided on the end thereof exteriorly of the housing with a rigidly attached small gear which meshes with a large ring gear exteriorly of the housing. Actuator means are provided exteriorly of the housing to adjustably rotate the ring gear in opposite directions to effect simultaneous adjusting movement of the rear section of all stator blades. The actuator means comprise a manually operable power assisted actuator and a power assist assembly.

8 Claims, 8 Drawing Figures

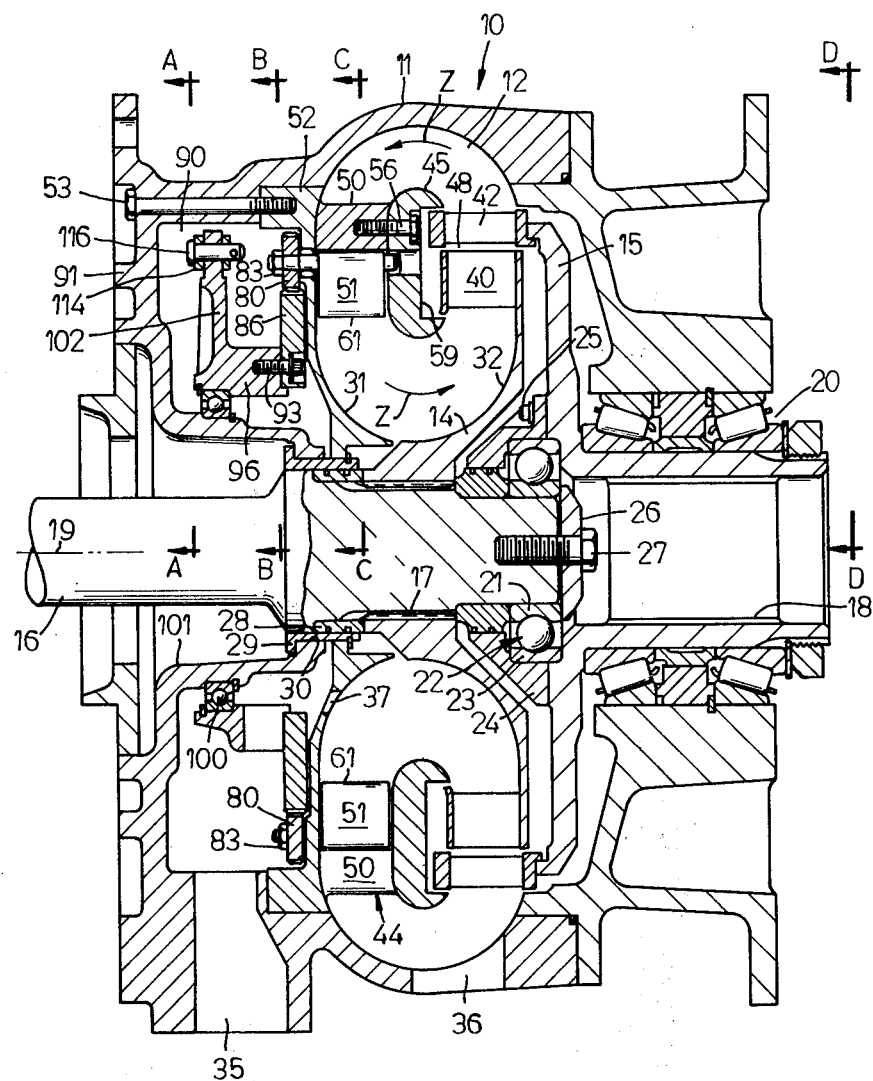
FIG. 1
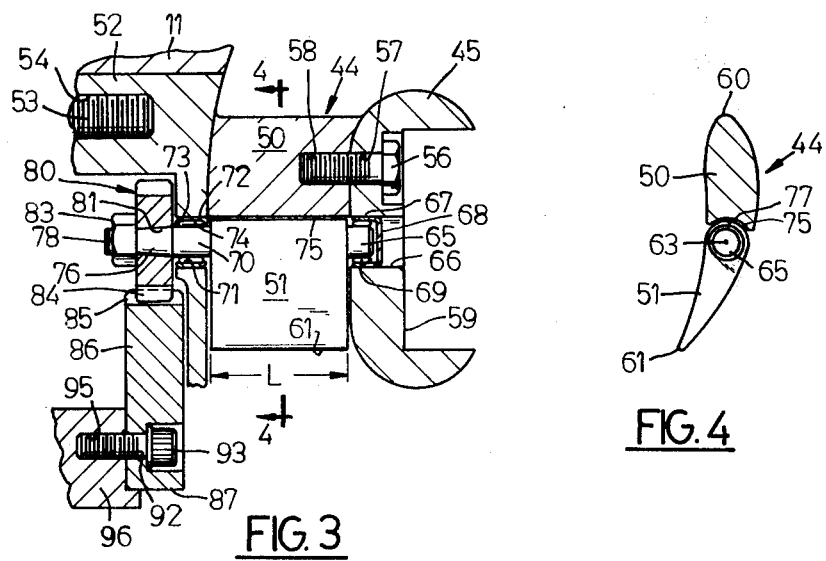
FIG. 3
FIG. 4

TORQUE CONVERTER HAVING ADJUSTABLY MOVABLE STATOR VANE SECTIONS

BACKGROUND OF THE INVENTION

1. Field of Use

This invention relates generally to power transmission torque converters having an impeller for driving a turbine and having radially disposed stator blades. In particular, it relates to stator blades having adjustably movable sections for controlling power output of the torque converter and to actuator means for moving the sections.

2. Description of the Prior Art

In transmission systems using torque converters, regulation or control of the power output at the output shaft of the converter can be accomplished in several ways. For example, in some systems, a modulatable clutch is located between the prime mover and the input shaft to the impeller. Mounted on the output member of the clutch is a speed sensitive governor valve externally controlled by means of a pressure control valve, as shown in U.S. Pat. No. 3,202,018 to C. R. Hilpert.

In some torque converters, power output can be adjusted or controlled by means of a so-called ring valve, which adjusts the flow of oil available to the impeller and turbine to thereby change the capacity of the converter. However, in such systems, as oil flow is reduced, turbine efficiency begins to fall off, and this is undesirable. Additionally, the ring valve when nearly closed, can cause destructive cavitation pulsations that have been known to break and loosen vanes.

In other torque converters, power output is regulated by using so-called "switch pitch" stator blades wherein each of the stator blades is swung or moved as an entire unit. However, in such an arrangement, performance begins to decline at both high speed ranges and low speed ranges because movement of the entire blade displaces the leading edge of the stator blade from its most desirable angle of attack or entrance angle relative to the oil circulating for the impeller and stator. Furthermore, the mechanical controls for prior art switch pitch stator blades are typically very thin and held in position by a small diameter pin, and the blades and pins are subject to gradual destruction in use resulting from oil flow therepast.

SUMMARY OF THE PRESENT INVENTION

In view of the foregoing, it is desirable to provide a torque converter having stator blades with adjustably movable portions whereby the output of the torque converter can be controlled in the most efficient manner.

A torque converter in accordance with the invention comprises a stationary housing within which a rotatable impeller is mounted for driving a rotatable turbine. The bladed impeller is mounted on an engine driven input shaft, and the bladed turbine is mounted on an output shaft on the same axis as the input shaft. The impeller blades and turbine blades move through an annular oil-filled passage. A plurality of stator blades are disposed in the passage in spaced-apart radial arrangement around the axis of the shafts. Each stator blade is divided into two sections, namely, a fixed forward section and an adjustably movable or pivotable rear section. Means are provided to pivot the rear sections of all of the stator blades simultaneously so as to vary the width of the flow channel between each pair of adjacent stator blades between fully opened and fully closed positions and any position therebetween to thereby control the amount of oil available for use by the impeller and turbine and thereby enable regulation of the power output of the torque converter. The movable rear section of each sator blade is provided with a stem which extends through a sealed opening in the stationary housing and enables pivotal adjustment of the rear section of the stator blade about the axis of the stem. The stem axes are parallel to the shaft axes. Each stem is provided on the end thereof exteriorly of the housing with a rigidly attached small gear which meshes with a large ring gear exteriorly of the housing. Actuator means are provided exteriorly of the housing to adjustably rotate the ring gear in opposite directions to effect simultaneous adjusting movement of the rear section of all stator blades. The actuator means comprise a manually operable power assisted actuator and a power assist assembly.

A torque converter having adjustably movable stator blades in accordance with the present invention offers several advantages over prior art devices. For example, there are no wearable parts which are directly exposed to the destructive action of the fluid flow. Furthermore, the control means for adjustably moving the stator blades is relatively simple and economical to manufacture and reliable in use.

It should also be noted that the fixed forward vane section serves two purposes. First, the relatively blunt leading edge has been developed for the optimum performance through a wide angle of attack of the approaching fluid. Secondly, it forms a fixed bridge between the two side walls of the channel without adding secondary support rods for the core ring which could reduce the unit efficiency.

The action of the movable rear portion of the compound vane is threefold. First, it changes the flow capacity by regulating the cross-sectional flow area. Second, it changes the pre-whirl, or angular momentum of the fluid entering the impeller cascade. The torque capacity of the impeller depends on a number of variables including flow quantity, fluid specific gravity and the entrance pre-whirl of the fluid. Third, the movable rear portion in combination with the fixed portion and the adjacent movable portions forms a gradually closing channel over a wide range of angular settings, thereby giving a smooth transition of angular flow adjustment without energy absorbing separation of the fluid from the controlling surfaces. In an enclosed system such as a hydrodynamic torque converter, flow disturbances created in a poorly designed flow passage will recirculate through the entire set of vane cascades, causing efficiency losses throughout. A torque converter having adjustably movable stator blades in accordance with the invention is particularly well suited, for example, for applications such as the following. If used in a transmission system for load hoisting apparatus, such as a crane, it is possible to maintain the spacing between adjacent stator blades fully open when full power output is required to raise a load and to fully close the passages to cut off as much power as possible as when the load on the crane is being lowered, thereby enabling the load to fall of its own weight as fast as is practical. Another usage is in connection with a split load system where it is desirable to be able to use either full power from the torque converter for one purpose or to reduce power from the torque converter so that power is available from the prime mover to other auxiliary devices. Another example would be application to an anchor winch drive wherein it is necessary to use some portion of the available power to put tension on an anchor line. Other objects and advantages of the invention will hereinafter appear.

DESCRIPTION OF THE DRAWINGS

FIG. 1 is a cross-section view of a torque converter in accordance with the invention;

FIG. 2 is a composite view showing in its upper left quadrant a cross-section view taken on line A—A of FIG. 1; in its upper right quadrant a cross section taken on line B—B of FIG. 1; in its lower right quadrant a cross-section view taken on line C—C of FIG. 1; and in its lower left quadrant an elevation view taken on line D—D of FIG. 1;

FIG. 3 is an enlarged elevation view of the uppermost stator blade shown in FIG. 1;

FIG. 4 is a cross-section view of the stator blade taken on line 4—4 of FIG. 3;

DESCRIPTION OF THE PREFERRED EMBODIMENTS

Figure 5:
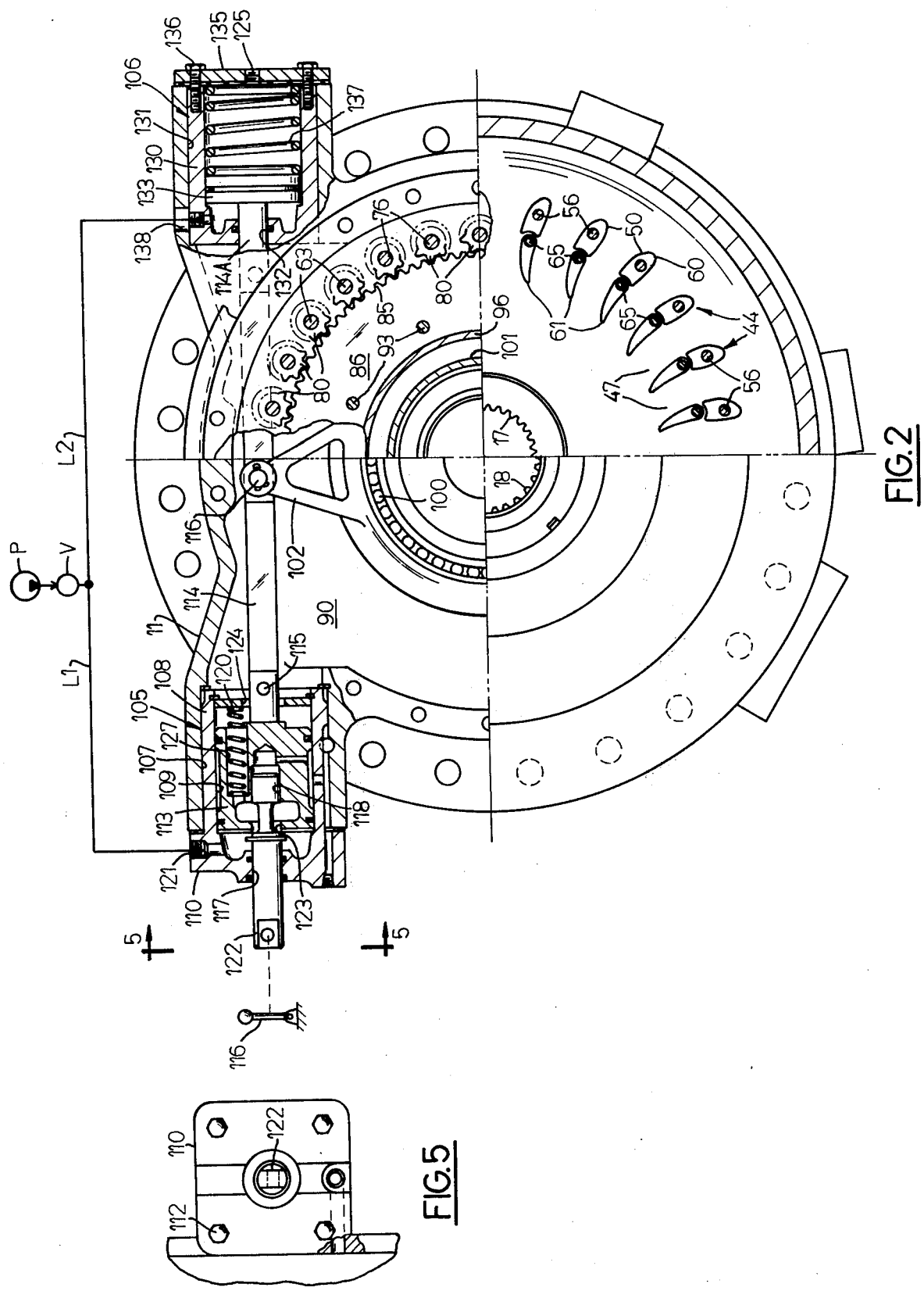
FIG. 5 is an end elevation view of the blade actuator means shown in FIG. 2.

Referring to FIGS. 1 and 2 of the drawing, the numeral 10 designates a torque converter in accordance with the present invention. The torque converter 10 comprises a stationary housing 11 having a generally toroidal cavity or passage 12 within which a rotatable impeller 14 is mounted for driving a rotatable turbine 15 by means of oil flow therebetween. The impeller 14 is mounted on and rotated by an engine driven input shaft 16, being connected thereto by means of a splined connection 17. The turbine 15 is integral with and drives an output shaft 18 which is located on the same axis 19 as the input shaft 16. The output shaft 18 is supported for rotation on housing 11 by means of an anti-friction roller bearing assembly 20. The input shaft 16 has its inner end supported for rotation on the inner race 21 of a roller bearing assembly 22 which has its outer race 23 attached to the turbine 15 by means of a clamping member 24 which is secured to turbine 15 by bolts 25. Shaft 16, which is supported at one end by bearing 22, must be supported on the other end by some suitable bearing to housing 11 (not shown). The ball bearing assembly 22 is also engaged on its opposite side by a plate 26 which is secured to the end of input shaft 16 by a bolt or cap screw 27. An oil seal 28 is provided between input shaft 16 and a bushing 29 which extends through a hole 30 in housing 11. The toroidally-shaped passage 12 is defined by a curved inner surface 31 attached to housing 11 and by a curved inner surface 32 of impeller 14. Housing 11 is provided with an oil inlet passage 35 through which oil is supplied to toroidal passage 12 through holes 37 in wall 31 and with an outlet passage 36 through which oil from passage 12 exits. The oil in passage 12 is forced by the driven impeller 14 against the turbine 15 to transmit power therebetween and a portion is circulated through passage 12 by means of the inlet 35 and the outlet 36 exteriorly of housing 11 for cooling purposes.

The impeller 14 is provided with a plurality of spaced-apart impeller blades 40 which are arranged near the outer periphery edge of the impeller in radial arrangement with respect to axis 19. Similarly, the turbine 15 is provided with a plurality of spaced-apart turbine blades 42 which are arranged near the outer periphery edge of the turbine in radial arrangement with respect to axis 19. A plurality of spaced-apart stator blades 44 are disposed in passage 12 in radial arrangement with respect to axis 19 between the surface 31 of housing 11 and a toroidally-shaped ring 45 which is centrally disposed in passage 12. During operation of the torque converter, oil circulates in passage 12 in the direction of the arrows designated Z in FIG. 1. During such oil circulation, oil flows through the spaces 47 between adjacent pairs of stator blades 44, through the spaces between adjacent pairs of impeller blades 40, across the space 48 between the impeller blades 40 and the rotor blades 42, through the spaces adjacent pairs of turbine blades 42, and returns to the spaces between the stator blades 44. In this manner, the driven impeller blades 40 are able to effect driving of the turbine blades 42. The impeller 14 and the turbine 15 both rotate in the same direction.

Referring to FIGS. 1, 3, and 4, it is seen that, in accordance with the invention, each stator blade is divided into two sections, namely, a fixed forward section 50 and an adjustably movable or pivotable rear section 51. All of the fixed forward sections 50 of the stator blades 44 are integrally formed with and project from a circular base section 52 which is rigidly secured to housing 11 by bolts 53 which screw into holes 54 in the member 52. The toroidal member 45 is secured to the inwardly projecting ends of the forward sections 50 of the stator blades 44 by means of bolts 56, each of which extends through a hole 57 in member 45 and screws into a threaded hole 58 in a forward section 50 of a stator blade 44. The member 45 is provided with a slot 59 for accommodating the inwardly projecting ends of the impeller blades 40 and turbine blades 42. As FIG. 1 makes clear, the passage 12 takes the form of a toroidal passage extending around the axis 19. However, during operation of the torque converter, the fluid flow circuit circulates in the path shown by the arrows Z in FIG. 1 around the member 45. Referring to FIGS. 3 and 4, each stator blade 44 has a general cross-sectional shape of an air foil with a leading edge 60 and a trailing edge 61. As FIG. 2 shows, the forward section 50 is shaped and mounted so as to assume an optimum angle of attack or present an optimum entrance angle to the oncoming oil or fluid entering the spaces 47 on opposite sides of the stator blade 44. However, the rear section 51 is pivotably movable about an axis 63 from a fully open position shown in solid lines in FIG. 6 to a fully closed position shown in dashed lines in FIG. 6. When rear section 51 is in its fully open position, maximum fluid flow is possible through the spaces 47. However, when rear section 51 is in its fully closed position, all fluid flow is prevented through the passages 47. As FIGS. 1 and 3 best show, rear section 51 of a stator blade 44 is adapted for pivotal or swinging movement about the axis 63 by means of an integrally formed cylindrical pin 65 which extends into a recess 66 formed in the member 45. A needle bearing assembly 67 is mounted in hole 66 and comprises a retainer 68 and a plurality of needle bearings 69 on which the pin 65 is rotatably mounted. The rear section 51 is also provided with an integrally formed cylindrical pin or shaft 70 which extends through a hole 71 provided in housing 11. A needle bearing assembly 72 is mounted in hole 71 and comprises a retainer 73 and a plurality of needle bearings 74 on which pin 70 is rotatably mounted. A sealing member 75 preferably formed of resilient material, such as nylon or teflon, is located in the curved space 77 between the rear surface of forward portion 50 and the forward surface of the rear section 51 of stator blade 44 to prevent fluid flow or leakage through the space 77 and thereby improve the hydrodynamic characteristics of fluid flow past the blade 44. Shaft 70 is provided with a tapered portion 76 and is provided with a threaded portion 78 at its outermost end. The tapered portion 76 of shaft 70 receives and supports a small spur gear 80 which is provided with a centrally located tapered opening 81. A nut 83 screws onto the threaded portion 78 of shaft 70 to secure the spur gear 80 in position. The spur gear 80 is provided with a plurality of teeth 84 which mesh with the teeth 85 on a large ring gear 86 which is mounted exteriorly of the annular passage 12 in housing 11. The ring gear 86 has its teeth 85 disposed on the outer periphery thereof and the ring gear is further provided with a large central opening 87 which accommodates extension of input shaft 16 therethrough, as well as elements such as the bushing 29 associated with shaft 16. The ring gear 86 is located within a chamber 90 which is defined by the outer end wall 91 of housing 11 and the circular base section 52 of the stator blade assembly. The ring gear 86 is provided with a plurality of holes 92 for accommodating bolts 93 which extend therethrough and screw into threaded openings 95 in a circular yoke 96 on which the ring gear 86 is supported. The yoke 96 is supported for limited rotation in opposite directions on a roller bearing assembly 100 which, in turn, is supported on a re-entrant portion 101 of housing 11. During assembly of the torque converter 10, it is necessary that all of the movable rear portions or sections 51 of the stator blades be in the same operative position. This is accomplished by manually moving all sections 51 to the same position such as fully closed position before the nuts 83 are fully tightened to force the spur gears 80 tightly onto the tapered portion 76 of their associated vane shafts. At this stage, the ring gear is moved and secured in what is to correspond to its blade closed position, whereupon each spur gear 80 meshes with the ring gear, and, as the nuts 78 are tightened, the spur gears 80 assume the correct orientation corresponding to blade closed position relative to the vane shafts 70 and are automatically tightened onto the tapered portion 81 of the shafts 70 as the nuts 83 are tightened. The yoke 96 is provided with an integrally formed lever arm 102 by means of which the yoke and its attached ring gear 86 are rotatably moved for a limited distance in opposite directions by actuator means which are mounted on housing 11 exteriorly of the passage 12.

The actuator means effect simultaneous adjusting movement of the rear sections 51 of the stator blades 44 to regulate the power output of torque converter 10. The actuator means comprise, for example, an actuator, in the form of spring loaded hydraulically applied motor, designated 105. As FIGS. 2 and 5 best show, the actuator 105 is mounted within a recess 107 formed in housing 11. Actuator 105 comprises a cylinder 108 having a bore 109 therein, and the cylinder 108 is rigidly secured within recess 107 and its bore 109 is closed by means of an end cap or plate 110 which is secured to housing 11 by means of bolts 112. A piston 113 is slideably mounted in bore 109 of cylinder 108 and is connected to one end of a piston rod 114 by means of a pin 115. The outer end of piston rod 114 is connected by means of a pin 116 to the lever arm 102 of yoke 96. A movable valve stem 122, manually operable by a lever 116 shown in FIG. 2, extends through a hole 117 in plate 110 and into a bore 118 in piston 113. Piston 113 is biased toward the outer end of cylinder 108 by means of a biasing spring 120 and is movable in the opposite direction to the desired extent in a conventional manner by application of hydraulic fluid to port 121 in response to movement of lever 116 and stem 122. Fluid is supplied to actuator 105 and a power assist assembly 106, hereinafter described, from a pump P, through a valve V and through supply lines L1 and L2. When actuator 105 is in the neutral or non-actuated position, the piston rods 114 and 114A act to exert a force on lever arm 102 and thereby maintain the ring gear 86, each of the spur gears 80, and each of the rear portions 51 of the stator blades 44 in fully open position. As the ring gear 86 is rotated clockwise with respect to FIG. 2, the spur gears are rotated counterclockwise with respect to FIG. 2 to cause the rear sections 51 of the stator blades 44 to pivot counterclockwise with respect to FIG. 2 from fully open position toward fully closed position. Of course, the extent or degree to which the sections 51 are moved between fully open and fully closed position is a function of the extent to which the ring gear is rotated by the actuator 105. Such movement simultaneously adjusts or moves the rear portions 51 of the stator blades 44 so as to vary the width of the flow channels between adjacent stator blades 44 to any position between fully open and fully closed position to thereby vary the power output of the torque converter 10.

The operation of the control is as follows:

High pressure oil (200 psi, for example) is forced into actuator 105 through port 121 and through metering land 123 between control stem 122 and servo control piston 113. Pressure buildup in bore 118 to the left of piston 113 forces servo control piston 113 to the right, in turn forcing control rod 114 to the right, which will rotate ring gear 86 through lever arm 102 and thereby move vane portions 51 via gears 80.

Oil entering from control land 123 will enter cavity 90 via chamber 127 for spring 120 and annular clearance space 124. As valve stem 122 is moved to right, fluid entering passage 121 will build up pressure, forcing piston 113 to the right against spring 120 until the spring force is balanced and the piston stops at a given position relative to valve stem 122. Thus, actuator 105 and its internal mechanism becomes a power assist positioning motor to locate the exit vane portions 51 at precise angular settings at the will of the operator who is free to move valve stem 122 by foot or hand or some other type of remote control device such as lever 116.

The actuator means further comprise a power assist assembly 106 which cooperates with the actuator 105 in positioning the exit vane portions 51 of the stator vanes. The power assist assembly 106 comprises a hollow, tubular sleeve 130 which is disposed within a recess 131 formed in housing 11. The sleeve 130 has a bore 132 at one end through which the piston rod 114A extends. Piston rod 114A is connected to a piston 133 within sleeve 130. The other end of sleeve 130 is closed by an end plate 135 which is secured in position by bolts 136. A compression type biasing spring 137 is disposed in the sleeve 130 between piston 133 and the end plate 135. The power assist assembly 106 is provided with a fluid inlet port 138 which admits fluid between the piston 133 and the enclosed end of the sleeve 130 and with a fluid exhaust port 125. The power assist assembly 106 does not exert a balancing force but provides a power assist to help move stem 114 and 114A by pressure applied at port 138 from the fluid line L2 which is interconnected with the fluid line L1 supplying port 121. A return force power assist can be applied by means of an operator controlled pressure introduced at port 125 and/or by one or more springs 137.

Figure 6:
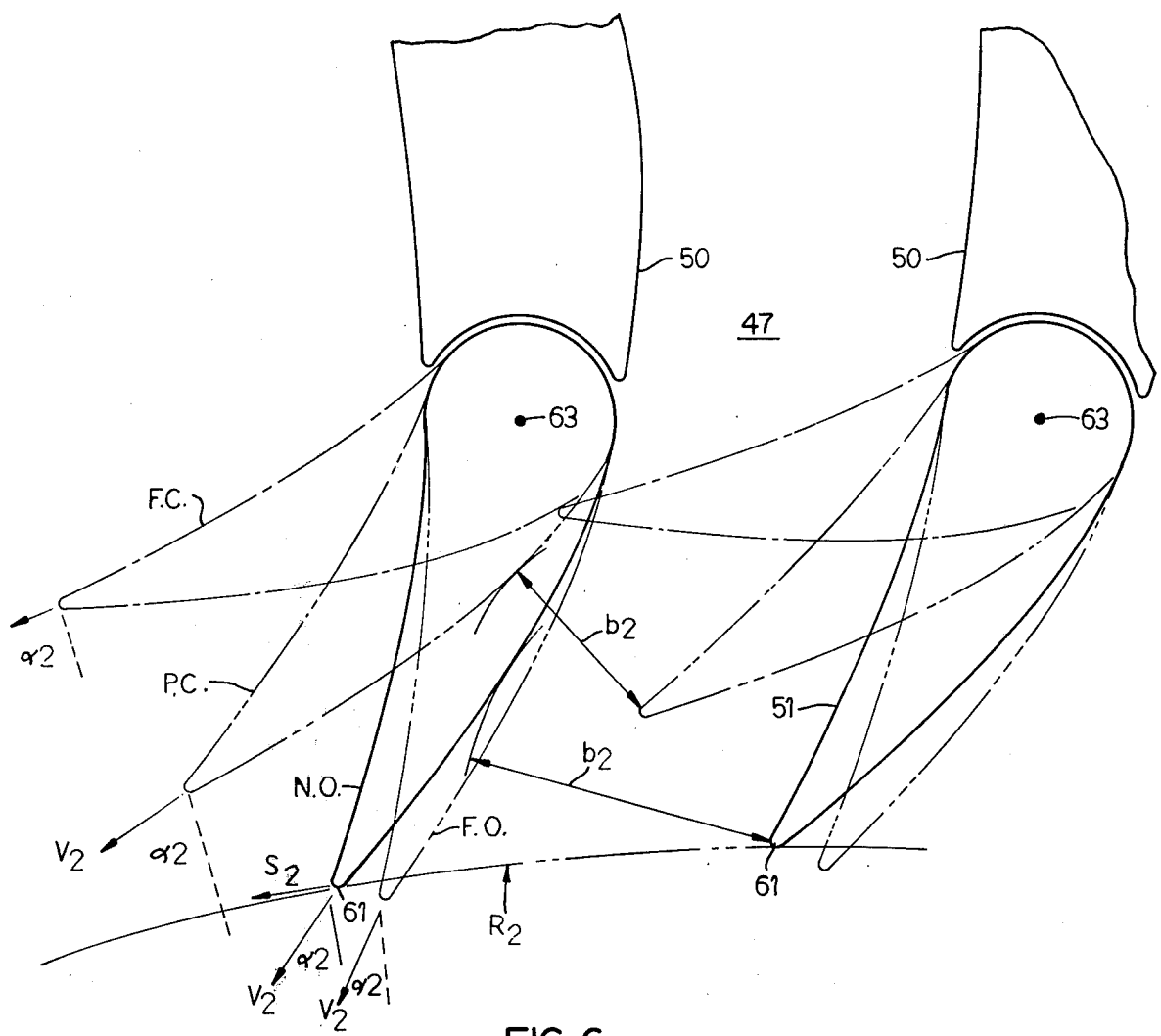
FIG. 6 is an enlarged cross-section view of a pair of adjacent stator blades showing the movable rear sections thereof in various operating positions.
Figure 7:
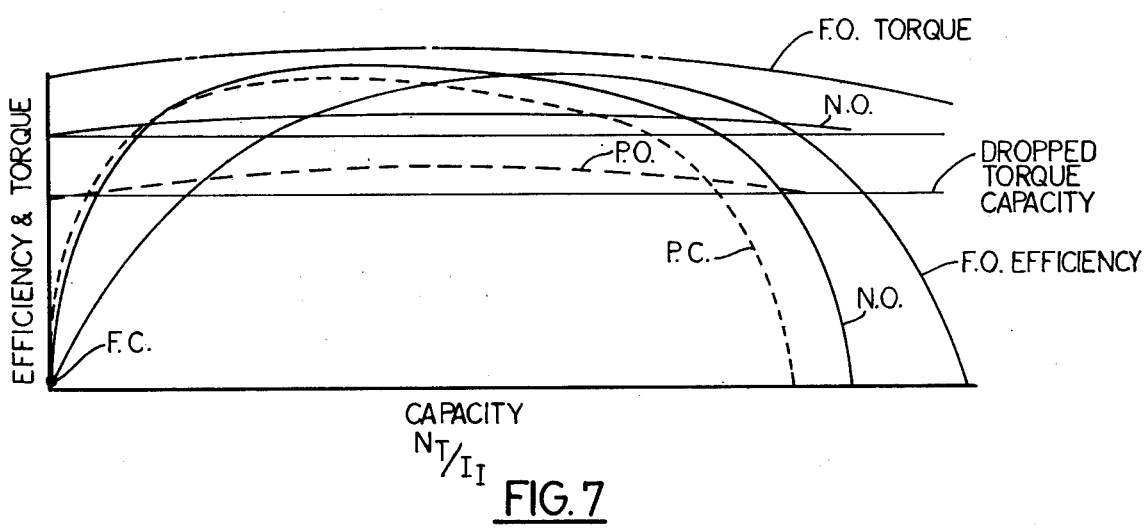
FIG. 7 is a graph depicting the operating efficiency and capacity of a torque converter in accordance with the present invention.

The graph in FIG. 7 depicts curves showing operating efficiency plotted against capacity for a torque converter in accordance with the present invention. The four curves shown in FIG. 7 are designated by initials indicative of the position of the movable rear section 51 of the stator blades, and the same initials are employed in FIG. 6 to indicate the blade positions. As the graph in FIG. 7 indicates, efficiency of the torque converter remains relatively high regardless of the position of the blades 51. The letters F.O. indicate fully open position. The letters N.O. indicate normally open position. The letters P.C. indicate partially closed position. The letters F.C. indicate fully closed position.

Figure 8:
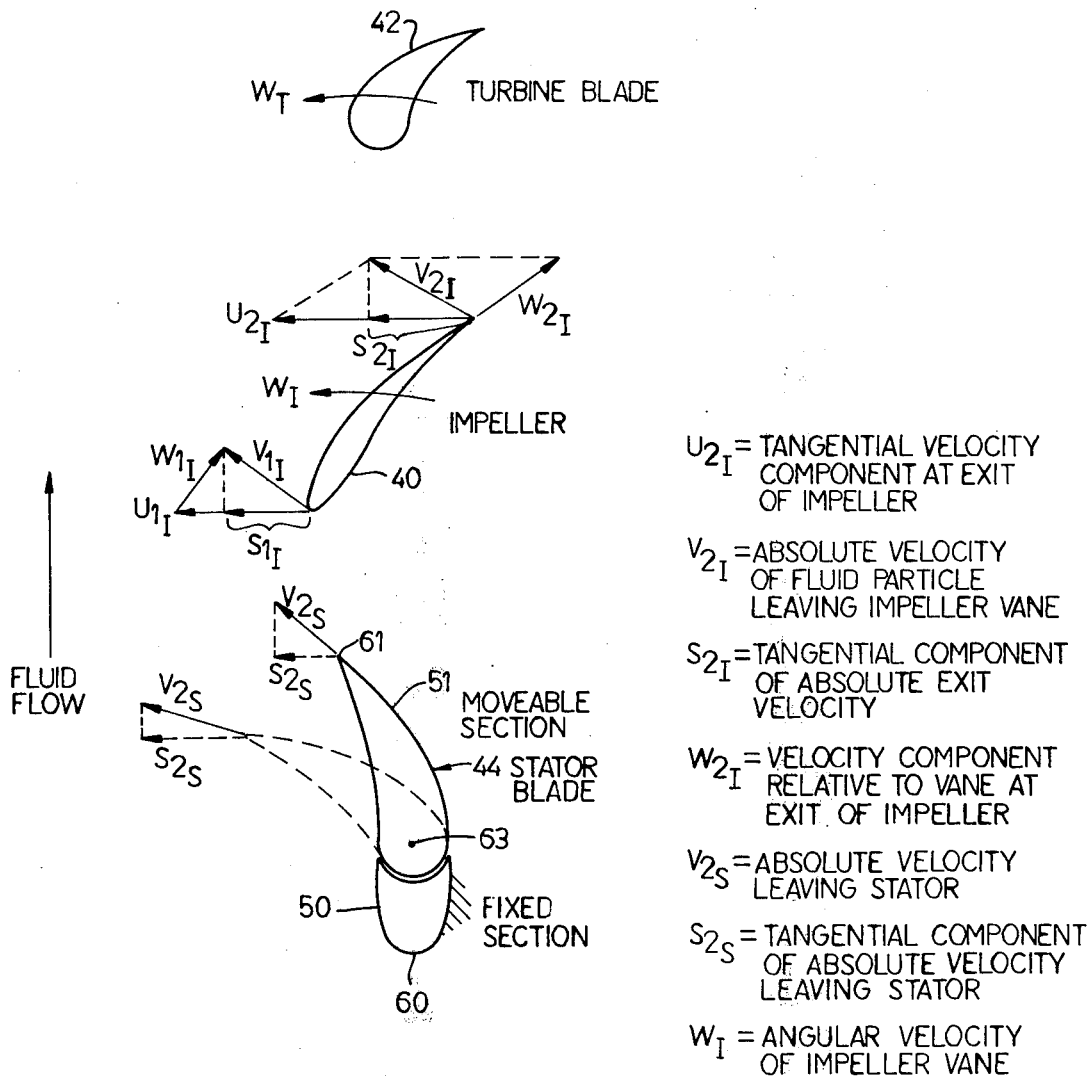
FIG. 8 is a schematic diagram showing the relationships between the turbine, impeller, and stator blades.

The principles of fluid flow with respect to the turbine, impeller and movable stator blade are discussed below in connection with FIG. 8. Referring to FIGS. 2 and 6, it is apparent that the area for flow control is determined by distance $b_2$ (the spacing between the trailing edge of one blade section 51 and the tangent surface of an adjacent blade section 51) times L (the length of the blade section 51) times the number of vane openings. As the flow area is reduced, fluid flow is reduced. Also, as FIG. 6 shows, the outlet angle $\alpha_2$ of the direction fluid at absolute exit velocity $V_2$ varies with the angular position of the exit portion of the vane section 51.

As FIG. 6 shows, the pre-whirl of fluid into an impeller blade 40 is determined by the tangential component $S_2$ of the absolute velocity $V_2$ and the radius $R_2$ of the vane tip.

The torque absorbed by the impeller of a hydrodynamic torque converter is determined as follows:

$$T = Q (w/g) (S_{2t} R_2 - S_{1t} R_{1t})$$

where:
T = Torque capacity in lb. ft.
Q = Flow - ft.$^3$/sec.
g = Gravitational constant ft/sec$^2$
R = Radius of respective vane tip from center axis
$S_{1t} R_{1t}$ = Fluid entrance angular momentum, impeller In a converter, the entrance momentum of the impeller equals the exit momentum of the preceding stage, in this case, the stator ($S_2$ $R_2$).

T could then be written as $$T = Q (w/g) (S_{2t} R_2 - S_{2s} R_{2s})$$

Thus, it can be seen that torque capacity of the impeller is influenced by the flow Q as well as exit momentum of the stator.

Movement of the outlet portions 51 of the stator vanes 44 directly controls both Q and the $S_{2s}$ $R_{2s}$ components of the equation. "Closing" the stator rear portions 51 increases the value of the inlet momentum at the impeller blades 40 while the exiting momentum remains the same. Thus, the net effect is a reduction in momentum change across the impeller blades 40 and a corresponding reduction in torque capacity.

A reduction in input torque capacity of the hydrodynamic torque converter 10 causes a corresponding reduction in output or delivered torque to the output shaft 18 to be used for speed control. The reduction in input capacity permits prime mover power to be diverted to auxiliary pumps or other power absorbing devices, thus enabling torque converter 10 to function as an infinitely variable power divider.

I claim:
1. In a torque converter:
a housing, a bladed impeller, a bladed turbine, and a stator including a plurality of stator blades, each pair of adjacent stator blades defining a passage through which fluid is circulated from said turbine blades to said impeller blades, each said stator blade having a forward portion and a relatively movable rear portion, said rear portion being adjustably movable to regulate fluid flow through said torque converter to thereby control the power output of said torque converter;
and means for effecting simultaneous movement of said movable rear portions of said stator blades to positions wherein each said passage can be fully open, partially closed or fully closed.
2. A torque converter according to claim 1 including sealing means disposed between said forward portion and said rear portion of said stator blade.
3. In a torque converter comprising:
a housing having a cavity therein for receiving fluid;
an impeller mounted on an input shaft for rotational drive thereby, said impeller having impeller blades in said cavity;
a turbine mounted on an output shaft for rotational drive by fluid directed against the turbine blades thereof by said impeller;
a plurality of stator blades mounted in spaced-apart relationship in said cavity and disposed in radial arrangement about the axis of said shafts and on the opposite side of a fluid flow circuit for said impeller blades and turbine blades;
each adjacent pair of stator blades defining a passage through which fluid is directed from said turbine blades to said impeller blades;
each stator blade comprising a stationarily mounted forward portion and a relatively movable rear portion, said rear portion being adjustably movable to regulate fluid flow in a passage adjacent said rotor stator blade to thereby control the power output of said torque converter;
and means for effecting simultaneous movement of the movable rear portions of all said stator blades to positions wherein each said passage can be fully open, partially closed or fully closed.
4. A torque converter according to claim 3 including sealing means disposed between said forward portion and said rear portion of said stator blade.
5. In a torque converter:
a housing having a major axis therethrough;
a toroidally shaped fluid cavity within said housing and disposed around said axis;

a bladed impeller rotatable on said axis and having a plurality of impeller blades movable around said axis in said cavity;

a bladed turbine rotatable on said axis and having a plurality of turbine blades movable around said axis in said cavity;

a plurality of stator blades disposed in said cavity and arranged around said axis;

each stator blade having a stationary forward portion and a relatively movable rear portion, said rear portion being adjustably movable on a minor axis parallel to said major axis to regulate fluid flow through said torque converter to thereby control the power output of said torque converter;

a member connected to said rear portion of said stator blade and extending outwardly of said toroidal cavity along the minor axis which said rear portion pivots;

said impeller operating to effect fluid flow in said cavity in such a direction so that fluid circulates in said cavity past said impeller blades, past said turbine blades and past said stator blades;

and means operatively connected to the said member connected to each stator blade for effecting movement of said movable rear portions of said stator blades.

6. A torque converter according to claim 5 wherein each pair of adjacent stator blades define a passage through which fluid is circulated from said turbine blades to said impeller blades.

7. A torque converter according to claim 6 wherein each pair of adjacent stator blades are simultaneously movable to positions whereby said passage can be fully open, partially closed or fully closed.

8. A torque converter according to claim 7 including sealing means disposed between said forward portion and said rear portion of said stator blade.

* * * * *